No. 756,122. Patented March 29, 1904.

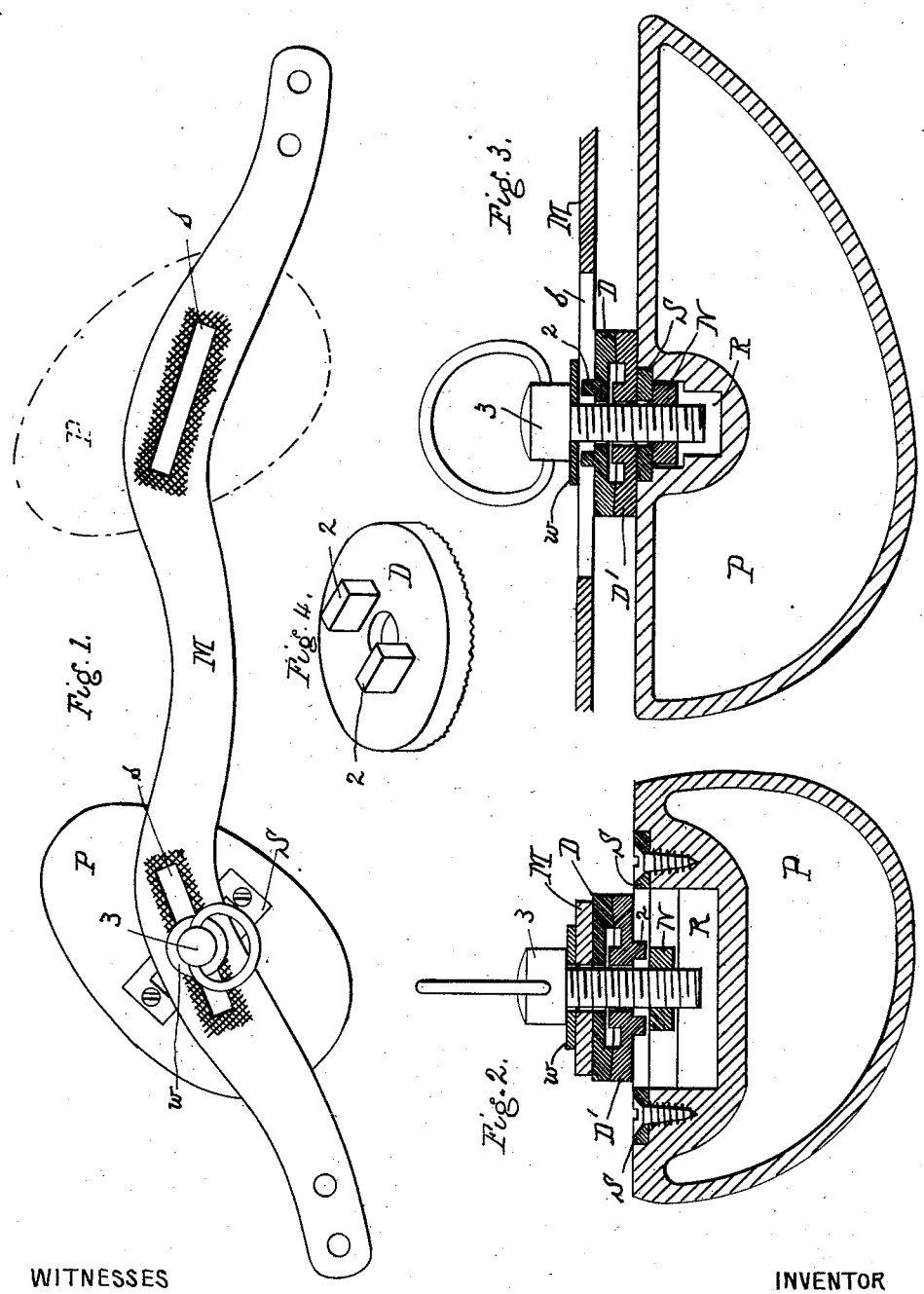

UNITED STATES PATENT OFFICE.

JOHN ELLWOOD LEE, OF CONSHOHOCKEN, PENNSYLVANIA, ASSIGNOR TO J. ELLWOOD LEE COMPANY, OF CONSHOHOCKEN, PENNSYLVANIA, A CORPORATION OF PENNSYLVANIA.

FASTENING DEVICE FOR TRUSS-PADS.

SPECIFICATION forming part of Letters Patent No. 756,122, dated March 29, 1904.

Application filed January 5, 1904. Serial No. 187,775. (No model.)

*To all whom it may concern:*

Be it known that I, JOHN ELLWOOD LEE, a citizen of the United States of America, and a resident of Conshohocken, in the county of Montgomery, State of Pennsylvania, have invented an Improved Fastening Device for Truss-Pads, of which the following is a specification.

The object of this invention is to improve the construction of the adjustable connecting device between a metal strip of a truss and the pad attached thereto, so as to allow the pad to be readily adjusted lengthwise of the strip and also readily turned axially when desired, but which when adjusted will be clamped securely in position.

In the drawings accompanying this specification I have shown two pads as being secured to a strip of metal. Flexible springs (not shown) are generally secured one on each end of the strip to carry other pads at their ends to fit the truss in place around the body, constituting what is well known as "Hood's" style of truss. It will be obvious, however, that the hereinafter-described fastening is capable of application to trusses of other styles.

In the drawings, Figure 1 is a view of a strip of Hood's style of truss carrying two pads. Fig. 2 is an enlarged transverse section through the pad and to the strip. Fig. 3 is an enlarged longitudinal section through the pad and a portion of the strip, and Fig. 4 is an enlarged perspective view of one of the clamping-disks.

Pads P, here shown as of the hollow hard-rubber type, are provided each with a central rectangular recess R, across which a nut N nicely fits, so as to be prevented from turning therein and yet free to be adjusted lengthwise of the recess. A slotted plate S, secured to the pad, covers this recess and prevents the removal of the nut N.

The strip of metal M is provided with longitudinal slots $s$ and is preferably serrated or roughened on one or both faces adjacent to said slots. Disks D and D', having central openings and serrated contacting faces, are provided, each having upon one of its faces rectangular projecting studs 2 2, Fig. 4, those of the disk D fitting snugly the slot $s$ in the strip M and those of the disk D' fitting snugly the slot in the plate S. A thumb-screw 3 passes through the strip M, disk D, disk D', and slotted plate S, and is threaded into the nut N in the recess R. As a consequence of such construction no relative turning motion can take place between the pad P and disk D' or between the strip M and disk D, while the serrated edges of the two disks when drawn closely together can have no turning motion relatively to each other. All motion of the disk D and the washer $w$ under the head of the screw 3 longitudinally in the slot $s$ is prevented by the roughened surface of the strip, and the pad when once adjusted and clamped by the screw 3 remains in adjusted position until the screw is loosened again.

I claim as my invention—

1. A truss having a recessed pad, a nut adjustable longitudinally in the recess, a slotted plate for the pad, a disk having a roughened upper face and adjustable longitudinally in the slot, and means to prevent its rotation therein, in combination with a strip having a similar disk and a screw passing through said disk and threaded into the nut, substantially as described.

2. A truss having a recessed pad, a nut adjustable longitudinally in the recess, a slotted plate for the pad, a disk having a roughened upper face and adjustable longitudinally in the slot, and means to prevent its rotation therein, in combination with a slotted strip, a disk adjustable longitudinally in the slot, means to prevent its rotation therein and a clamping-screw for fastening said strip, disks and pad together, substantially as described.

3. A truss having a recessed pad, a nut adapted to be adjusted longitudinally in the recess without rotation, and a slotted plate for the pad, in combination with a disk having rectangular studs fitting said slotted plate, a strip, a disk therefor and a screw passing through said disks and threaded into the nut, substantially as described.

In testimony whereof I have signed my name to this specification in the presence of two subscribing witnesses.

JOHN ELLWOOD LEE.

Witnesses:
M. E. WRIGHT,
A. A. BARR.